Fig.1.

April 18, 1933.    R. F. MACFARLANE ET AL    1,904,742
ICING BISCUITS AND THE LIKE
Filed Dec. 11, 1928    6 Sheets-Sheet 6

Patented Apr. 18, 1933

1,904,742

UNITED STATES PATENT OFFICE

ROBERT FRENCH MACFARLANE, OF FULHAM, LONDON, AND WILLIAM EDWARD PRES-
COTT, OF WILLESDEN, LONDON, ENGLAND, ASSIGNORS TO BAKER PERKINS COM-
PANY INC., OF SAGINAW, MICHIGAN

ICING BISCUITS AND THE LIKE

Application filed December 11, 1928, Serial No. 325,194, and in Great Britain December 30, 1927.

This invention relates to the manufacture of biscuits and the like of the kind which are iced or sandwiched with a layer of cream or the like.

Hitherto it has been the practice to make iced or cream sandwich biscuits by presenting the biscuits by hand to a stencil plate and depositing a layer of icing or cream by wiping a quantity of material over the stencil.

The object of the present invention is to provide an automatic method and means whereby the process of icing biscuits or sandwiching a layer of cream between biscuits is carried out with precision in a reliable and expeditious manner.

For convenience hereinafter the coating or layer for the biscuits will be generally referred to as "cream".

The invention consists in an automatic method of icing or making cream sandwich biscuits and the like by aid of an endless train of biscuit supports, consisting in feeding biscuits thereto, bringing the biscuits and stencils into register and effecting relative vertical displacement of the biscuits and stencils so that cream is deposited upon the biscuits, separating the biscuits from the stencils and passing the biscuits on for discharge or removal, with or without the intermediate step of superimposing a second biscuit for forming a sandwich.

A feature of the invention lies in causing the stencils and biscuits to travel in coincident paths at the same rate so that during the cream-depositing period no relative movement exists between the stencil and the deposit under treatment.

According to the invention a preferred form of machine adapted to carry out the above method comprises a continuously moving endless conveyor having a train of biscuit platforms, which for a portion of their path travel in an arc, a table or slider adapted to travel in a horizontal path and having a post for gathering and maintaining the position of the biscuits, a cam rail for displacing the platforms vertically and relatively to the post, a rotary stencil plate or disc having a series of stencil apertures arranged on a circle of the same radius as the arc of travel of the biscuit train, means for revolving the plate at the same rate as the train moves round the arc, a biscuit hopper arranged before the cream-depositing position (or a pair of hoppers, one before the cream-depositing position and one after) and means, preferably in the form of a fixed plough, for deflecting the finished biscuits from their platforms for delivery purposes, the arrangement being such that in operation the platforms receive each a biscuit slid from a hopper by the post in passing, are then depressed to clear the stencil plate, subsequently elevated to receive the cream deposit, again depressed and are passed to discharge or removal preferably by the action of the plough, for which purpose they are elevated, or where a sandwich is to be formed they are elevated to receive a second biscuit slid from the second hopper by the post, and then passed to discharge.

A further feature of the invention lies in the provision of a rotary stencil pan for depositing cream stencil shapes upon a succession of biscuits, having a series of stencils or apertures annularly arranged in a plate or disc bottom, a collecting device adapted to direct cream from the outer and inner margins of the pan in the path of the stencils and a strickler in the same path for wiping over the stencils as they pass and deflecting the cream away therefrom.

Further features of the invention will be hereinafter described and defined in the claims.

In the accompanying drawings:—

In Figures 1, 2 and 3 certain parts are omitted for the sake of clearness.

Figure 11 is a fragmentary plan view.

Figure 3:
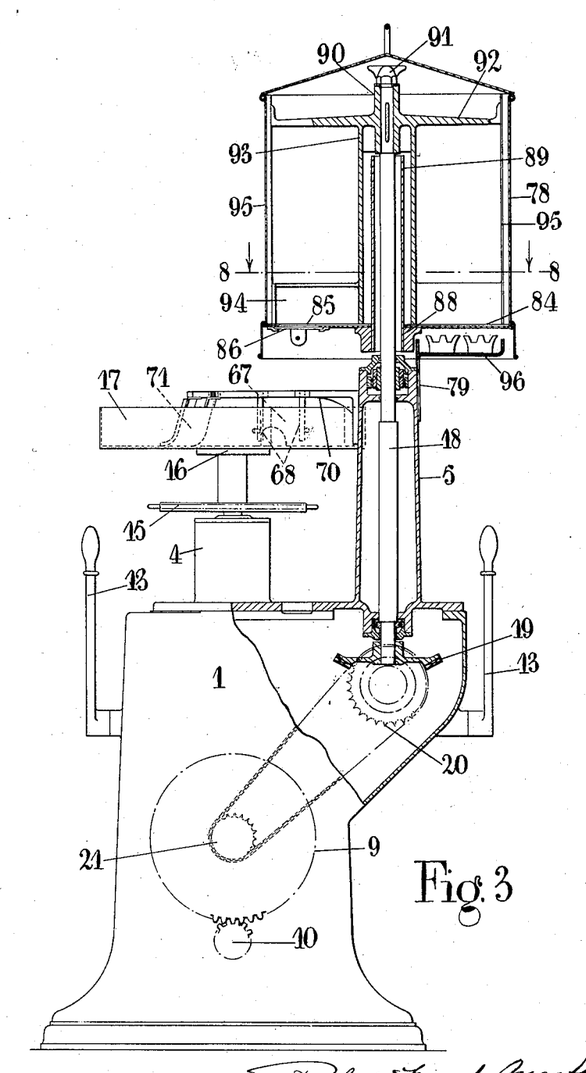
Figure 3 is an end view, partly in section, of the machine seen in Figure 1.

In carrying the invention into effect according to one convenient mode, as applied by way of example to the manufacture of cream sandwich biscuits, a base or pedestal 1 (Figures 1 and 3) has a bracket or arm 2 adapted to support certain parts of the apparatus, as will be hereinafter described, and a plate 3 which carries a pair of columns 4 and 5. The column 4 has bearings for a vertical shaft 6 driven through bevel gear 7 from a cross shaft 8 which receives its motion from a loose gear wheel 9, pinion 10 and motor 11, through a clutch 12 operable by hand levers 13. On the upper end of the shaft 6 a head 14 is rigidly secured which comprises a chain wheel 15 and a seating 16 for a cream stencil pan 17. The column 5 has bearings for a hopper shaft 18 which may be conveniently driven through bevel gear 19, chain and chain wheels 20 from the chain wheel 21 secured to the gear wheel 9.

The pedestal 1 is also adapted to support on columns or other convenient posts or brackets, an outer and an inner U-shaped guide element, respectively numbered 23 and 22 in the drawings, for maintaining the horizontal travel of the biscuit-supporting means to be described. The guide elements 22, 23 are also supported on posts carried by the bracket arm 2.

Beneath the guides 22, 23 a U-shaped cam rail member 24 is provided which it is preferred adjustably to mount from the arm 2 on posts 25 and 26 which are vertically adjusted by screw threaded means operable by the handwheel 27 on the post 25, the rotary motion of which is simultaneously communicated to a nut 28 around the post 26 by means of a chain 29. Towards the outer end of the arm 2 a vertical stub shaft 30 is secured around which a chain wheel 31, corresponding with the chain wheel 15, is adapted to revolve.

The biscuit-supporting means comprises a platform 32 (Figures 1 and 4) which may be covered by sponge rubber 33 or by any other suitable cushion or pad, suitable for the reception of a biscuit. The platform 32 is rigidly secured upon a spindle 34 surrounded by a slidable sleeve 35 carrying at its lower extremity a pair of lugs 36 in which a cam roller 37, adapted to ride upon the cam rail 24, is rotatably mounted. For the purpose of maintaining the position laterally of the roller upon the cam rail the lugs 36 may have projections or extensions 38 adapted to lie upon either side of the cam rail.

Around the upper end of the sleeve 35 a short sleeve member 39 is slidably mounted and this sleeve is formed integral with, or has rigidly secured to it, a table-guide or slider 40 and projections 41 adapted to form the right and left components of a link of a chain adapted to pass round the chain wheels 15 and 31. The sleeve 35 terminates short of the upper end of the sleeve 39 which preferably projects beyond the table 40 to form a bushing 42. The spindle 34 may have a flange 43 immediately below the platform 32 for seating against the bushing 42. Between the flange 43 and the upper end of the sleeve 35 a light spring 44 is provided, and around the sleeve 35 and the lower part of the sleeve 39 a spring 45 is arranged. The spring 45 is adapted to maintain the roller in contact with the cam rail 24. The roller 37 is adapted to communicate vertical displacement from the cam to the sleeve 35 and to the platform 32, the spring 44 serving to cushion this motion and afford a margin for relative movement between the sleeve 35 and the platform.

The table guide 40 has a post or biscuit-engaging and positioning member 40b upstanding therefrom and preferably accommodated in a slot 33a in the platform and its covering. The post is of a height such that it passes in its travel along the guide track clear of the bottom of the stencil pan 17 and into operative engagement with stacked biscuit-feeding hoppers, to be referred to hereinafter. The post 40b, it will be appreciated, always travels at a constant elevation while the vertical position of the table 32 and, consequently, the biscuit, is varied in respect to the post according to the displacements effected by the contours of the cam 24. The posts 40b may be adjustable, if desired, and are adapted to drive or control the horizontal travel of their biscuits.

Figure 1:
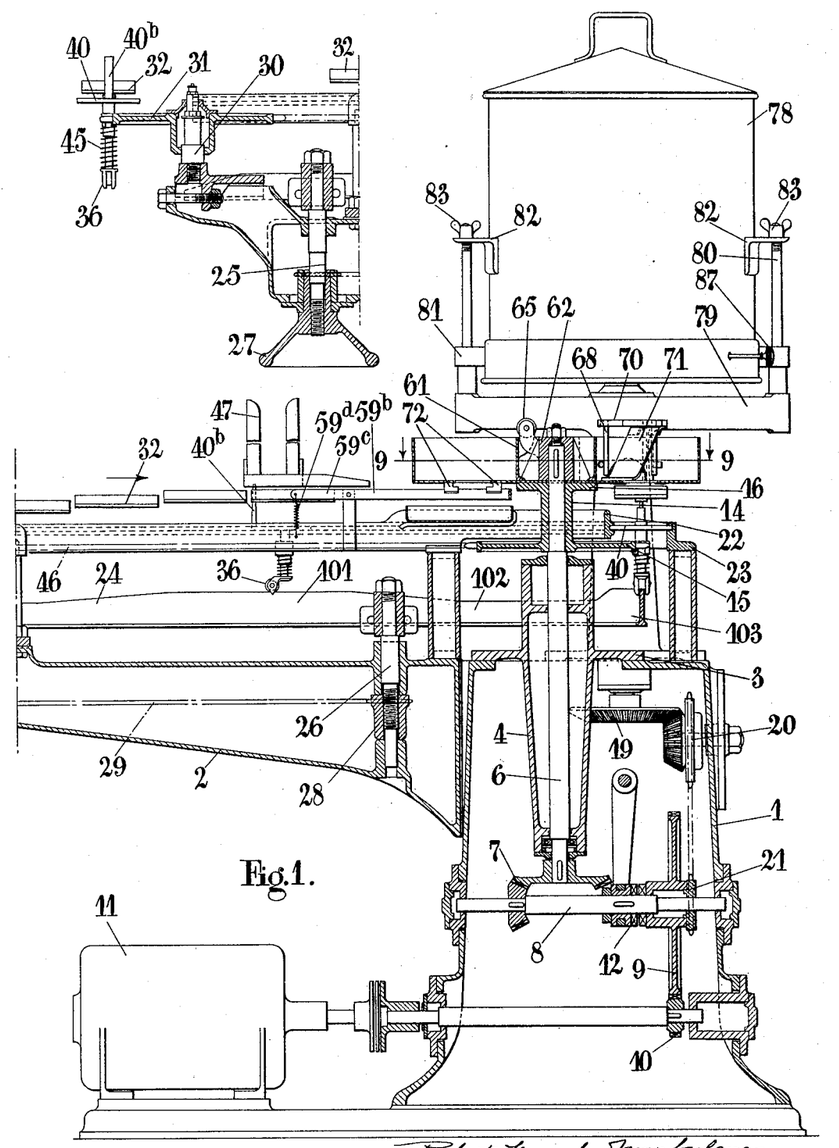
Figure 1 is a longitudinal sectional elevation of a machine constructed according to one form of the invention.
Figures 2, 8, 9:
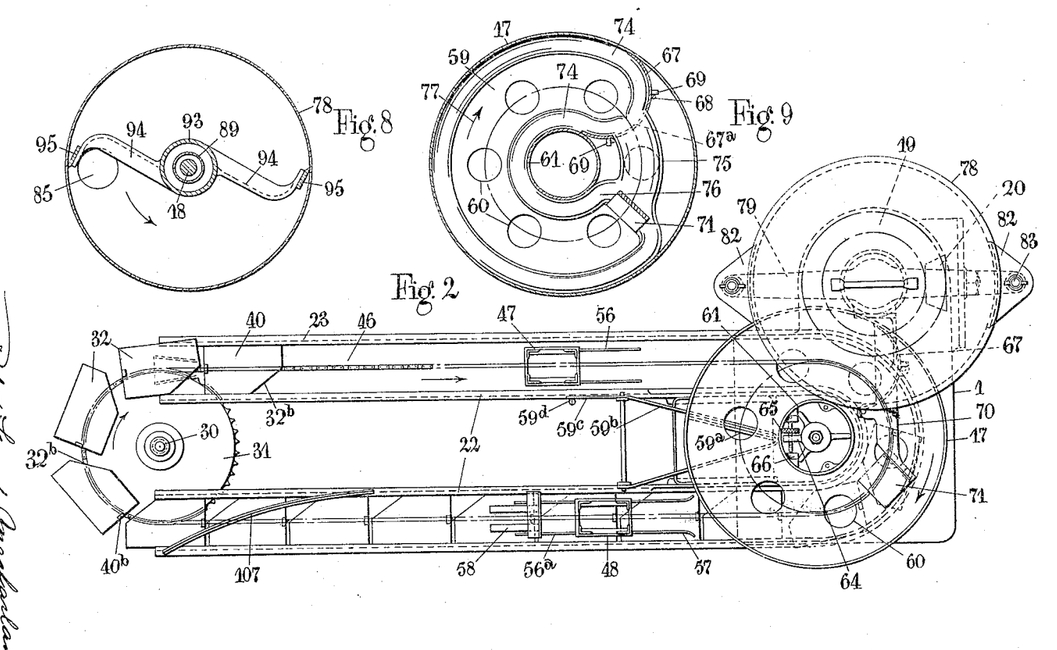
Figure 2 is a plan view corresponding to Figure 1.
Figure 8 is a sectional plan taken on the line 8—8 of Figure 3 to show the disposition of stirring and batch feeding means in the cream supply hopper seen in Figures 1, 2 and 3.
Figure 9 is a sectional plan view taken on the line 9—9 of Figure 1 illustrating the arrangement and features of the stencil pan.

The table-guide 40 is adapted to slide in grooves formed in the facing surfaces of the rails 22 and 23 and be guided therein in a fixed horizontal path, see Fig. 1. To facilitate the travel of the tables 40 around the curved portion of the guide rails, their outer edge may be rounded or radiused. The biscuit platforms 32 may be closely coupled together and in order to negotiate the curved parts of their path and prevent their fouling one another one of their corners may be shaped or cut off as seen in Figure 2 at 32b. The outer ends of the guide rails and grooves may be slightly flared to facilitate the entry of the tables between the guides after they have passed around the chain wheel 31.

A single biscuit-supporting means has been described above and for the purpose of the invention a series or train of these biscuit-supporting means, such as indicated in Figures 1 and 2, is provided and mounted as a part of a chain 46 which passes around the two chain wheels 31 and 15 and is driven by the latter through the gears described above. Each link member 41 is coupled by a suitable intermediate link or links to the corresponding link member of the next biscuit-supporting means so that the train of biscuit-supporting means is driven and travels in endless procession around the course or path seen in Figure 2.

It will be observed that the guides and cam rail 24 are of U-shape, that is to say, the portions around the chain wheel 31 are omitted, for the reason that their continuance around this chain wheel position would serve no useful purpose as the meshing of the chain links upon the chain wheel 31 affords an effective transfer of and support for the biscuit platforms and associated parts, from one leg of the U-shaped guide rails to the other.

In Figure 2 at positions 47 and 48 biscuit hoppers are indicated, the hopper 47 being adapted to supply each of the biscuit platforms 32, in succession, with a biscuit intended to receive a layer of cream, while the hopper at 48 is adapted to superimpose a biscuit upon the cream layer deposited upon the first biscuit to complete the sandwich when the machine is intended to produce such goods. Where single biscuits are to be iced the second hopper may be omitted or put out of action.

The hoppers comprise (see Figures 5, 6 and 7) a vertically slotted box or guides 48, 49 for the reception of a vertical stack of biscuits, seen at 50. The box is open at the bottom to permit the passage of the posts 40b of the travelling biscuit supports. The lowermost biscuit of a stack rests on a pair of inwardly projecting ledges 51 which may have slots 52 to permit the escape of crumbs to prevent their collection on the ledges. On both sides (i. e. longitudinally) of the hopper a slot or opening 53 (see Fig. 6) is provided and depending into the slot on the side of the hopper from which the biscuits pass out, is a finger or tongue 54 which may be secured by a set screw device 55 working in a slot in the hopper so that the vertical height of the finger 54 may be adjusted, according to the thickness of the biscuits. The function of this finger is to hold or retain the lowermost biscuit but one in the stack position until the lowermost biscuit has been slid from under it.

In its action, the post 40b of the biscuit support 40 is adapted, in travelling through the slots 53 of the hopper, to strike and slide out the lowermost biscuit which resides on the ledges 51, while the biscuit above is prevented from sliding by the tongue 54. As soon as the lowermost biscuit is removed the stack settles down under gravity so that the removed biscuit is replaced by another one which is free to be slid out by the post of the next following biscuit support.

For the purpose of aligning the biscuits as they are deposited on the pads 33 of the biscuit platforms 32 and pass away from the hopper, the latter for employment at position 47 is provided with a pair of more or less resilient lateral guiding plates 56, while in the case of the hopper for position 48 similar aligning guides 56a are employed and in order to align under the hopper the biscuits already on the biscuit pads 33, having had cream deposited thereon, flared plates 57 are provided. In conjunction with the hopper 48 means are provided for gently pressing the superimposed biscuit as it leaves the guides 56a. This pressing device may comprise a pair of resilient tongues 58 (see Figures 2 and 5) suitably mounted over the track of the biscuit platforms.

The stencil pan 17 is formed with a plain disc bottom 59 in which stencil apertures 60 are provided, the shape of which corresponds with the shape of a biscuit to be treated. In the present example the stencils are circular. The spacing interval or pitch of the apertures corresponds with the interval between the posts of the biscuit supports as they pass on their arcuate path around the chain wheel 15. The center of each stencil lies upon a circle having the same radius as that of the arcuate path.

The disc 59 has an outer wall and an inner wall or hub member 61. A central aperture is provided in the disc 59 so that the pan may be fitted over the end of the shaft 6 and be secured by a cap piece 62 (see Fig. 1) keyed to the shaft and adapted to clamp the disc by means of a nut 63. The cap has a lug 64, Fig. 2, with a screw threaded hole into which is screwed a setting pin having a milled wheel 65 the ends of the pin being adapted to engage projections or lugs 66 formed on the inner surface of the wall 61. Upon rotation of the milled wheel the pin is revolved and caused to move endwise, effecting a small angular displacement of the pan 17 as a whole with respect to the shaft 6. This adjustment is for enabling a fine angular setting of the stencil apertures to be effected.

The stencil pan, being mounted on the main shaft 6 which also carries the chain wheel 15, is given a unidirectional rotation at the same angular velocity as the chain wheel 15. As the centres of the stencils and the arcuate path of the biscuits coincide it will be observed that while the biscuits travel in this path there is no relative transitional movement between the stencils and the biscuits and, consequently, the transfer of perfectly shaped and undistored stencil deposits can be secured.

In the annular space between the inner and outer walls of the pan a collecting or concentrating device 67 is mounted so that cream lying towards the walls of the pan is directed inwardly to the annular zone in which the stencil apertures revolve. This concentrating or collecting device may be in the form of a curved plough or plate extending from side to side of the annular space and having a slot or aperture 67a in the vicinity of the stencil zone for allowing the passage of a stream of cream. The collecting device may be readily removable and may be conveniently held in position by the engagement of a pair of posts 68 with projecting pins 69 on the collecting plate. These posts are secured to and depend from an arm or bracket 70 secured to the column 5 (see Fig. 3). This arm may also conveniently carry a scraper, or what may be termed a strickling member 71, preferably set at an angle to the horizontal. As the stencils pass under the strickler 71 the bulk of cream is held back and the stickler wipes the surface of the pan so that each stencil aperture is filled with cream flush with the stencil disc surface.

In Figure 9 the collecting device 67 is seen concentrating the streams or bands of cream 74, lying adjacent the walls of the pan towards the centre of the annular pan space, into a stream 75 which passes through the aperture 67a in the device 67, so that the path of the stencil apertures is completely flooded. As the cream is carried round with the pan and meets the stationary strickler 71 it will be seen that besides its strickling action over the stencils as they pass under it, the stream 75 is again divided and deflected towards the walls of the pan at 76. The direction of rotation of the stencil pan is seen by the arrow 77.

Figure 11:
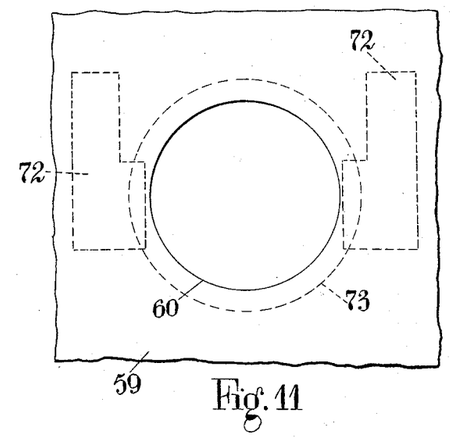
Figure 12:
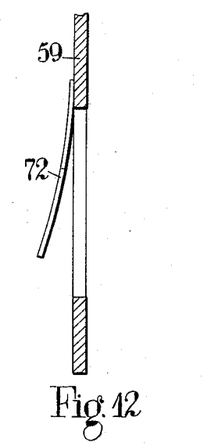
Figure 12 is a sectional view, of a stencil aperture showing the position of a biscuit with respect thereto and to the resilient means for separating a biscuit after it has received a cream layer through the stencil aperture.

On the under-side of the pan disc adjacent each stencil aperture a pair of spring fingers or tongues 72 is mounted so as to be just clear of the margin of the stencil apertures but adapted to be engaged by the side margins of the biscuits and pressed towards the stencil disc by the vertical movements of the biscuits, in order that when the biscuit platforms are in succession lowered, the separation from the stencil opening of each biscuit with its cream layer is insured. In Figure 11 the stencil opening is shown at 60 while the dotted lines 73 indicate the lie of a circular biscuit with respect to the fingers 72.

For the purpose of keeping the under surface of the stencil pan clean a wiper 59a secured to a pivoted support 59b is provided, Fig. 2. The support has an extension 59c to which a spring 59d is attached in order resiliently to press the wiper into contact with the under face of the pan. The wiper depresses and rides over the spring tongues 72 as they pass round with the pan.

To maintain an adequate supply of cream to the stencil pan, a hopper 78 is detachably mounted in any convenient manner upon a cross support or beam 79 carried by the column 5, as for example by the provision of a pair of posts 80, Fig. 1 over which pairs of apertured lugs 81 and brackets 82 fit, the hopper being finally secured in position by fly nuts 83. This arrangement enables the hopper bodily to be removed with facility. The hopper is provided with a floor 84 having a discharge aperture 85 covered by a sliding door or shutter 86 which may be manipulated from outside the hopper by a rod having a milled head 87. The floor is also provided with a central aperture around which a bush 88 is secured in which is mounted a standpipe 89.

The shaft 18 within the hopper supports a stirring device. This may comprise a head 90 keyed upon the end of the shaft 18 and secured by means of a wing nut 91. The head 90 supports a series of guiding or steadying arms 92 which lightly contact with the interior wall of the hopper. A tubular extension 93 from the head 90 carries a pair of stirring and delivery arms 94 (see Figure 8) which may have curved ends formed as scrapers, or on which scrapers 95 are mounted, and which are preferably scoop-shaped or overhung, so as to tend to direct the cream downwardly towards the floor of the hopper. When the aperture 85 is open, twice in each revolution of the shaft 18 the arms cause a batch of cream to be discharged through the aperture. The hopper is arranged so that its discharge aperture registers with the position in front of the collecting plate 67 or between the collecting plate 67 and the strickler 71 of the stencil pan so that the stream 75 (Figure 9) periodically receives an increment of cream. The cream in the hopper 78 may be kept warm by burners 96 or electrical heating units. If desired the hopper 78 may be provided with stirrers or discharge device adapted to cause a small continuous discharge of cream into the pan 17.

Figures 4, 7, 13:
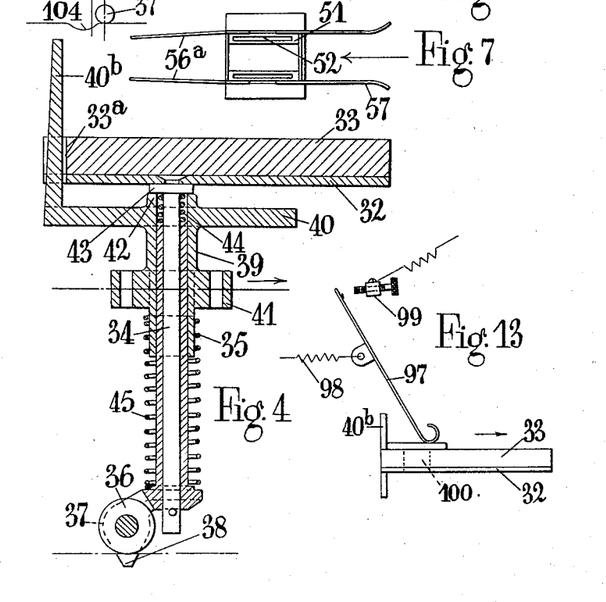
Figure 4 is a detail sectional elevation of a biscuit support comprising a platform and post and means for mounting such in connection with a machine as shown in Figure 1.
Figures 5, 6 and 7 are, respectively, side and end elevations, and plan view, of a biscuit hopper (illustrating certain improvements) and suitable for use in conjunction with the plant shown in Figure 1.
Figure 13 is a diagrammatic view illustrating electrical means for stopping the machine when the absence of a biscuit from a platform is detected.
Figures 5, 6:
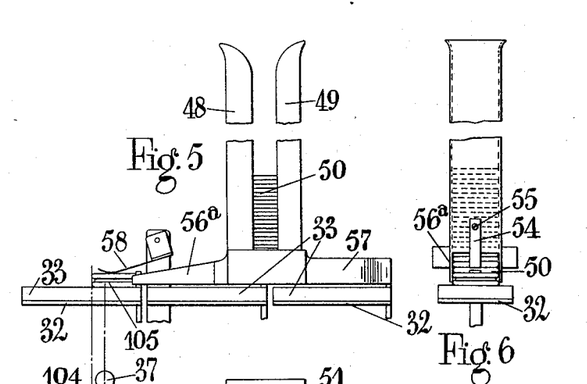
Figure 10:
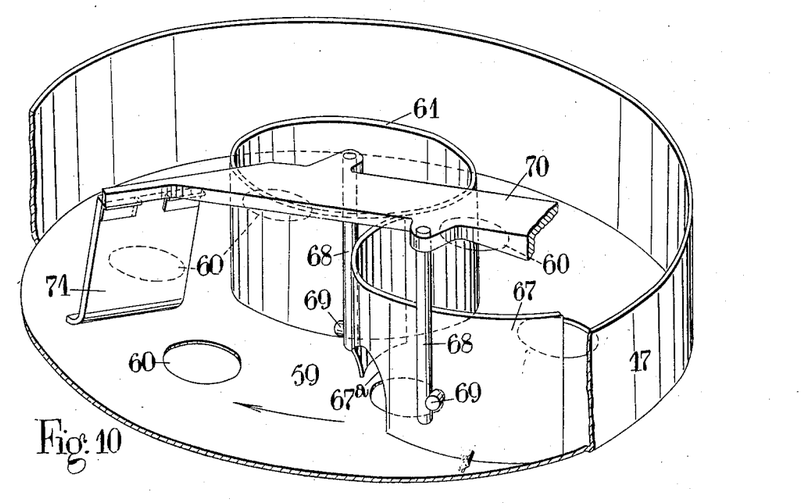
Figure 10 is a perspective view of the stencil pan, part of which is broken away to illustrate the arrangement of the cream plough or concentrating means and the scraper or strickler.

In order to prevent the continued running of the machine in the absence of a feed of biscuits or in the absence of a single biscuit from a biscuit platform, a detecting device may be provided adapted to throw out the clutch 12 by aid of a suitable servo-motor (not shown) or otherwise stop the travel of the train of biscuit platforms. A suitable detecting device is shown in Figure 13 wherein a light pivoted finger 97 is adapted to ride over the biscuits and act as a feeler by gravity. The finger is connected in an appropriate electric circuit by the lead 98. The opposite end of the finger may be adapted to make contact with an adjustable electric terminal 99. In conjunction with the detecting device the biscuit pad and platform are formed with an aperture or slot 100 lying in the path of the end of the finger 97 and normally covered by a biscuit. When biscuits are present on the platforms the finger will ride over the biscuits and the contacts at 99 will remain open. Should, however, a biscuit be absent then the end of the finger 97 will fall into the slot or aperture 100, thus permitting the finger to swing about its pivot and make the electric circuit. This circuit actuates the servo-motor and immediately throws out the clutch 12, bringing the chain 46 and stencil pan to a standstill. Similarly the circuit may control the shutter 85 of the cream hopper 78 to discontinue the supply to the pan 17.

The U-shaped cam track 24 is given a contour to raise and lower the biscuit platforms in accordance with the various functions to be performed. The cam is provided with an elevated portion 101 for raising the biscuit platforms to receive biscuits from the hopper 47 and is provided with a similar elevated portion on its other leg to raise the platforms to receive biscuits from the hopper 48 and to aid in the discharge of the biscuits. A depressed portion 102 is formed on the cam to enable the biscuits to pass clear of the bottom of the stencil pan and the spring fingers 72. An elevated portion is provided in the cam at 103 at the arcuate part around the chain wheel 15 for elevating the platforms for the biscuits to receive cream from the stencils and cause the platforms to travel in this elevated position for the required period. The elevated part 103 is followed by a depression to withdraw the biscuits and separate them from the stencils. In the region where the platforms leave the guides 56a of the biscuit hopper 48 a subsidiary depression 104 (see Figure 5) is provided and the cam roller 37 will be observed about to enter this depression. This depression temporarily lowers the biscuit platforms to avoid any flipping action of the spring fingers 58 on the tail end of the biscuits (see for example the biscuit 105 about to travel from underneath the fingers 58).

Figure 14:
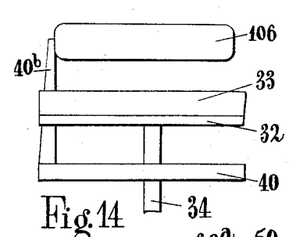
Figures 14 to 20 are diagrammatic side elevations of a biscuit platform and post, illustrating the various positions throughout a cycle of operations according to the invention.
Figure 15:
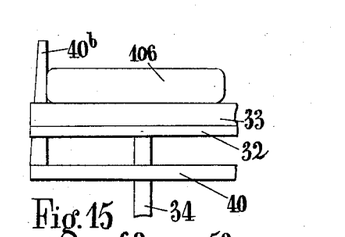
Figure 16:
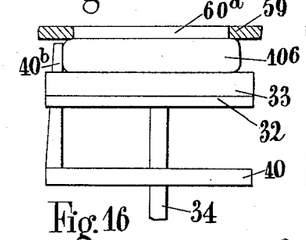

The cycle of operations of the machine is as follows:

The biscuit platforms pass in endless procession on the path or track defined by the chain 46. The sliders 40 travel in the guides 22 and 23 which maintain the travel of them and the posts 40b in a constant horizontal plane, while the engagement of the cam roller 37 with the cam rail 24 causes the platform 32 to be elevated and depressed in accordance with the contour of the cam. The direction of travel of the chain is seen in Figures 1 and 2 by the arrows. As the platforms travel towards the biscuit hopper 47, they are, in succession, elevated by the hump 101 in the cam and maintained at an elevated travel for the reception of biscuits. As each platform (see Figures 14 to 20) passes under the hopper, the post 40b slides out the lowermost biscuit 106 (see Figure 14) so that it is deposited upon the pad 33 and lies against the post. The depression 102 of the cam track causes the platform 32 to be lowered while the platform and biscuit are travelling under the near part of the stencil pan to the stencilling position, in order that they may pass clear of the stencil disc and the fingers 72 (see position in Figure 15). As the cam roller 37 of a biscuit platform arrives at the elevated portion 103 of the cam, the platform elevates its biscuit into contact with a registering stencil aperture 60 (Figure 16) and this position is maintained for an arcuate period of travel until the stencil aperture has passed under and clear of the strickler 71. Thus the biscuit receives a deposit or layer of cream from the stencil aperture which adheres to it.

Figure 17:
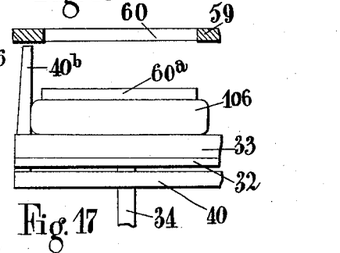
Figure 18:
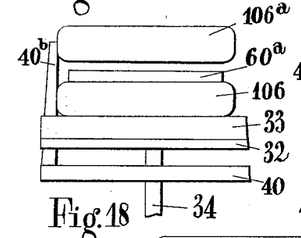
Figure 19:
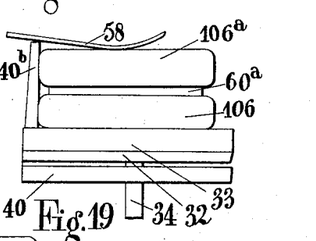

After leaving the strickling position the cam roller 37 rides into another depression of the cam, thus causing the biscuit to be lowered clear of the stencil disc (see Figure 17) and the action of the fingers 72 ensures the separation of the biscuit therefrom so that it comes away with the deposited layer 60a of cream.

Where sandwich biscuits are to be made the platform 33 is again elevated on approaching the biscuit hopper 48. The sides of the biscuit are engaged by the guides 57 and its position adjusted or aligned. As the platform passes beneath the hopper the post 40b slides out the lowermost biscuit 106a so that it is accurately deposited and superimposed upon the cream layer 60a (Figure 18). As the biscuit leaves the hopper the guides 56a register and align the upper biscuit 106a with the under biscuit 106 and the spring fingers 58 lightly press the top biscuit and settle it snugly upon the cream so that the sandwich is completed. As the sandwich passes from under the fingers 58 the platform is momentarily dropped (Figure 19) by cam depression 104 (Figure 5) to avoid any flip which the fingers might tend to give to the tail of the sandwich and unsettle the position of the biscuit or unduly squeeze the cream.

After the sandwiches have been completed all that remains is to remove them from the platform. This, of course, can be effected by hand but it is preferred to employ a device for discharging them automatically and laterally from the path of the train of biscuit platforms.

Figure 20:
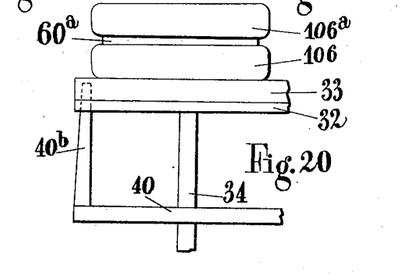

According to one convenient mode, across the path of the platforms a fixed plough or cam rail 107 is secured at an elevation slightly above the path of the top of the post 40b. The cam track 24 is provided with a further hump adapted to raise the biscuit platform after leaving the hopper 48 to a height above the top of the post 40b (see Figure 20) so that the biscuits may, as they engage the plough 107, be diverted from their path and directed for discharge. A discharge chute may be provided for the biscuits and mounted in the vicinity of the plough 107 to receive the biscuits diverted by it from the train. The chute may be inclined downwardly so that gravity may aid in the discharge, and it is preferred to provide the chute with an endless travelling band or conveyor adapted to carry the biscuits to any suitable collecting, row-composing or stacking means.

In the foregoing account of the machine and its operation the cam 24 has been shaped to raise the biscuit platforms to receive biscuits from the biscuit hoppers. As an alternative, however, the biscuit platforms may be arranged to travel at this period in a constant horizontal path spaced from the under-side of the stencil pan sufficiently to give the biscuits clearance in passing to the depositing position. After the biscuits have been deposited they may return on the horizontal path, or on a parallel path at a slight elevation, to the second hopper to receive a second biscuit where a sandwich is desired. From the second hopper they may be raised for discharge purposes and then returned to the constant horizontal path.

According to a modification, instead of providing a stencil pan a stencil disc may be employed in direct conjunction with a supply hopper, being arranged to pass under or through the delivery therefrom to be filled with the stencil layer of cream. The biscuits are elevated into engagement with the stencil apertures to form a bottom for the stencil as it fills itself from the hopper, the side of the hopper being adapted to wipe over the stencil as the disc revolves and carries the stencil away, acting very much in the same manner as the strickler referred to in connection with the stencil pan.

The endless train or path described above for the biscuits consisting of two rectilinear laps having semicircular ends, is a convenient and efficient form but it will be appreciated that the same effect can be attained by making the path of a train of biscuit platforms other configurations and while it is convenient to pass the train around chain wheels a similar effect can be gained by giving the train a concave or re-entrant travel during the depositing position, such as would, for example, cause them to engage a stencil plate on the near side instead of on the far side as shown in Figure 2.

According to another form the stencilling operation can be carried out during a period of rectilinear travel, in which case the stencil plate would be given a reciprocating or oscillatory motion.

Interchangeable stencils may be provided for the disc or pan, that is to say, standard apertures may be formed in the disc or pan and adapted to receive interchangeable stencil plates. Adjustments may be afforded to maintain the biscuits centrally with respect to the various stencils, as for example by adjusting the radial or lateral position of the platform post and/or by altering the setting of the conveyor with regard to the disc.

It will be appreciated that in other respects various equivalent devices or appliances might be substituted for those described herein, and in this sense it is to be understood that the various pieces of apparatus and means described are introduced as suitably indicating the various functions to be performed according to the invention.

We claim:

1. In combination a stencilling machine comprising biscuit platforms adapted for continuous travel in an endless train the runs of which lie substantially in one horizontal plane and travel in a path defined by a pair of rectilinear portions joined at each of the adjacent ends by a substantially semicircular portion, and a co-operating rotary stencil plate mounted over a semicircular portion.

2. In combination a cream stencilling machine comprising biscuit platforms in an endless train the runs of which lie substantially in one horizontal plane and include two rectilinear portions, and means for supplying biscuits to the platforms during their travel in a rectilinear portion of the train, and means for applying cream to said biscuits during their travel in an arcuate portion of the train.

3. In combination, a stencilling machine including a chain conveyor carrying biscuit platforms in an endless train the runs of which lie substantially in one horizontal plane, chain wheels, guiding elements for supporting the chain in a fixed path intermediate the chain wheels, and a rotary stencil plate coaxial with a chain wheel.

4. A stencilling machine of the type described having vertically displaceable biscuit platforms in an endless train, the runs of which lie substantially in one horizontal plane, a vertically displaceable member associated with each platform, means for elevating said displaceable member, and a cushioning spring interposed between each member and its associated platform for transmitting the vertical displacement of said member to said platform, whereby the platform when elevated is vertically yieldable.

5. A stencilling device of the type described having vertically displaceable biscuit platforms in an endless train the runs of which lie substantially in one horizontal plane, and means for elevating the platforms normal to the horizontal and a rail extending diagonally across the path of travel of said train at a height to be encountered by biscuits thereon when said platforms are in elevated position.

6. A stencilling machine of the type described having biscuit platforms movable in an endless train that includes a circular portion and straight runs lying substantially in one horizontal plane, a rotary stencil device having an annular series of stencil apertures adapted to be closed on their under side by biscuits on said platforms while traversing the circular portion of the path, and means for displacing the platforms vertically so that each biscuit contacts with the stencil device to close the underside of a stencil aperture during the stencilling of the preceding biscuit.

7. In a stencilling machine of the type described, an apertured stencil disc, fingers mounted thereon adjacent the apertures and positioned for engaging the biscuits and separating them from the underside of the stencil disc.

8. In combination an endless conveyor chain mounted for travel in a horizontal plane, guide rails, guide elements on the chain slidingly engaging said rails for lengthwise travel thereon, biscuit platforms mounted for up-and-down movement relative to said guide elements, a cam rail extending adjacent the path of travel of the chain, a plurality of riders contacting with said rail and each operatively connected to a platform for moving said platforms up and down during its forward travel.

9. A structure as set forth in claim 8 wherein each sliding guide element carries a fixed upstanding post, a biscuit supply hopper arranged to deliver its lowermost biscuit onto one of the traveling platforms when said biscuit is contacted by the post associated with said platform, and that part of said cam rail at the point of discharge formed to elevate each biscuit platform above the top of its associated post.

10. Apparatus for feeding or collecting biscuits from a supply and depositing them in a train or procession comprising a train of biscuit platforms, a post for each platform, a horizontal guideway and a cam track, said horizontal guideway arranged for effecting the travel of the posts at all times in a horizontal plane, said cam track arranged to produce a vertically variable plane of travel for the platforms.

11. A biscuit platform adapted to travel as one of a train said platform carried in a slider to which traction is applied, a horizontal guide way for said slider and a cam-engaging member operatively connected to said platform for communicating vertical displacement thereto.

12. A biscuit supporting means adapted to travel as one of a train and comprising a vertically displaceable biscuit platform having an upright spindle for guiding such displacement, a sleeve coaxial with the spindle, a cam roller on said sleeve, a stationary cam track for communicating displacement to the sleeve, a chain element including a slider, a post thereon, and a cushioning device operatively interposed between the chain element and said sleeve and a guiding track for said slider, for the purposes set forth.

13. In combination, a biscuit conveyor mounted for travel in a path that is arcuate in part, a rotary cream pan including a disc overlying the arcuate part and having an annular series of stencil apertures, means for applying a biscuit to the under side of said disc during its rotation, a stationary strickler arranged to wipe over the apertures as they pass thereunder, means for supplying cream to a stencil aperture while closed by a biscuit and prior to the arrival of the biscuit at the strickling position.

14. A rotary stencil device for use in stencilling means of the kind described, having an annular series of stencil apertures, a collecting device adapted to direct cream into the path of the apertures and a strickler in the same path for wiping over the apertures.

15. A rotary disc having annularly arranged stencil apertures and a strickler to which cream is delivered from a supply on the disc remote from the strickler, in combination with an endless train of biscuit platforms constrained to travel in a path of which a part is arcuate in a horizontal plane and coincident with the arrangement of the stencil apertures, the remainder of said path being away from the stencil disc.

16. In a stencilling machine of the kind described, a disc having an annular series of stencil apertures, resilient fingers secured to the disc adjacent the marginal edges of said apertures, said fingers normally sprung away from the disc.

17. A rotary stencil disc for use in stencilling means of the kind described, having an annular series of stencil apertures, said disc mounted on a shaft and having screw-actuated means operatively positioned between the shaft and disc adapted to effect angular adjustment of the disc with respect to the shaft.

18. In combination, a biscuit stencilling and sandwich forming machine comprising biscuit platforms adapted for travel in an endless train, the runs of which lie substantially in one horizontal plane, a stationary biscuit hopper, means traveling with each platform for drawing out a biscuit from said hopper to lie upon the platform, a rotary stencil plate having a series of apertures adapted to coincide with a part of the circuit of the train of platforms for applying a layer of cream to the biscuits, on the platforms, and a second stationary hopper located in the circuit beyond said stencil plate from which covering biscuits are drawn by said means to lie upon the creamed biscuits on the platforms.

19. In combination, an endless train of platforms adapted to travel in an endless train, the runs of which lie substantially in one horizontal plane, a support for each platform, an upstanding post associated with each platform and carried by a mount constrained to travel at all times in a horizontal plane, a hopper holding a stack of biscuits associated with the circuit, means adapted to displace each platform vertically relatively to its post to receive a biscuit removed from said hopper by said post, means adapted vertically to displace each platform relatively to its post to raise each biscuit into engagement with a rotary stencil plate where the biscuit receives a layer of cream or the like, a second hopper holding a stack of biscuits associated with the circuit, means adapted to lower the platform vertically with respect to its post to receive a covering biscuit removed from said second hopper by the post, and means for vertically displacing each platform relatively to its post at a discharge position in the circuit so that the sandwich is freed from the post for discharge from the platform.

In testimony whereof we have signed our names to this specification.

ROBERT FRENCH MACFARLANE.
WILLIAM EDWARD PRESCOTT.